US006716021B2

(12) United States Patent
Worley et al.

(10) Patent No.: US 6,716,021 B2
(45) Date of Patent: Apr. 6, 2004

(54) CROSSHEAD EXTRUSION SYSTEM

(75) Inventors: Joseph C. Worley, Canton, NC (US); Gene L. Patterson, Ocala, FL (US)

(73) Assignee: Dayco Products, LLC, Miamisburg, OH (US)

( * ) Notice: Subject to any disclaimer, the term of this patent is extended or adjusted under 35 U.S.C. 154(b) by 139 days.

(21) Appl. No.: 09/923,974

(22) Filed: Aug. 7, 2001

(65) Prior Publication Data

US 2003/0031750 A1 Feb. 13, 2003

(51) Int. Cl.[7] .................... B29C 47/12

(52) U.S. Cl. .................... 425/379.1; 425/380; 425/461

(58) Field of Search .................... 425/113, 192 R, 425/378.1, 379.1, 380, 461

(56) References Cited

U.S. PATENT DOCUMENTS

| | | | | |
|---|---|---|---|---|
| 3,922,128 A | * | 11/1975 | Solomon | 425/113 |
| 4,330,017 A | | 5/1982 | Satoh et al. | |
| 4,361,455 A | | 11/1982 | Arterburn | |
| 4,798,526 A | | 1/1989 | Briggs et al. | |
| 4,832,588 A | | 5/1989 | Rasmussen | |
| 5,031,568 A | * | 7/1991 | Milliman | 425/113 |
| 5,183,669 A | | 2/1993 | Guillemette | |
| 5,524,673 A | | 6/1996 | Noone et al. | |
| 5,566,720 A | | 10/1996 | Cheney et al. | |
| 5,780,066 A | | 7/1998 | Guillemette | |
| 5,830,516 A | | 11/1998 | McAlpine et al. | |
| 5,873,941 A | * | 2/1999 | Milliman | 118/419 |
| 5,882,694 A | | 3/1999 | Guillemette | |
| 5,964,945 A | * | 10/1999 | Milliman | 118/405 |
| 5,980,226 A | | 11/1999 | Guillemette | |
| 6,077,062 A | * | 6/2000 | Guillemette et al. | 425/113 |

* cited by examiner

*Primary Examiner*—Robert Davis
*Assistant Examiner*—Joseph S. Del Sole
(74) *Attorney, Agent, or Firm*—Joseph V. Tassone; J. Daniel Lykins

(57) ABSTRACT

An extrusion system for extruding a layer of a plastic or rubber material onto a work piece without having to continuously adjust the extrusion system during the "set-up" mode to "full-run" mode, wherein the extruded layer exhibits a predetermined cross-section size and a uniform wall gauge concentricity.

8 Claims, 5 Drawing Sheets

10 12 18 20 22 14 22 26 28 28 32 26 22 20 40 14 22

18 38 42 42 44 22 22 32 22 22 24 44 22 22

CROSSHEAD EXTRUSION SYSTEM

BACKGROUND OF THE INVENTION

The present invention relates to an extrusion system containing a fixed center die module which requires no mechanical adjustments, for continuously extruding a molten material or a formable mass to provide a tubular structure having a predetermined cross-section size and a uniform wall gauge concentricity. More particularly, the present invention relates to a crosshead extrusion system.

Hoses made primarily of polymeric materials are widely used for transporting various fluids such as water, gasoline, coolants, power steering fluids, transmission fluids, etc. Typically, these hoses are used in automobiles, trucks, buses, aircraft, locomotives and water craft to transmit such fluids. Generally, for such applications it is necessary to provide high pressure hoses having multiple layers, including reinforcing layers, in order for the hoses to withstand the pressures and temperatures involved, and to meet the various federal and state emission regulations, and still exhibit dimensional stability and rugged durability required for today's fuel powered internal combustion engines. For example, U.S. Pat. No. 4,330,017 to Satoh describes an automobile fuel hose comprising a two-ply rubber tube covered with a reinforcing fiber layer and further with a protective rubber layer. The hose is constructed from a very thin inner layer of a fluorine-containing rubber which is resistant to fuel, and an outer layer of a synthetic rubber such as epichlorine rubber or ethylene-acrylic rubber which is less resistant to gasoline, but is superior in cold resistance. The extrusion system of the present invention can be used in the manufacture of any polymeric hose, e.g. garden hoses, air pressure hoses, and industrial hoses such as those used in connection with hydraulic presses and the like.

U.S. Pat. No. 5,566,720 to Cheney et al. proposes a multiple layer hose comprising a first layer made up of a melt processible fluoroplastic terpolymer wherein the innermost surface is capable of prolonged exposure to hydrocarbon-containing fluids, and a second layer composed of a resinous thermoplastic material such as polyamide which is bonded directly to the outwardly oriented surface of the first layer.

U.S. Pat. No. 5,524,673 to Noone et al. describes an elongated tubing which includes a first layer of an extrudable, melt-processible thermoplastic material, and a second layer of an extrudable, melt-processible thermoplastic material wherein the second layer is capable of sufficiently permanent laminar adhesion with the first layer to prevent delamination during the desired lifetime of the tubing. At least one of the first and second layers is resistant to permeation of hydrocarbons. In addition to the first and second layers, the tubing includes a third layer adhered to the second layer.

Typically, multi-layer tubular structures are manufactured using extrusion processes and, more particularly, using crosshead extrusion processes as described in U.S. Pat. No. 4,361,455 to Arterburn. Such crosshead extrusion systems are employed not only in the manufacture of rubber tubes and hoses, but also for coating cylindrical work pieces with highly viscous materials such as unvulcanized rubber as described in U.S. Pat. No. 4,832,588 to Rasmussen, and in the manufacture of coated wire and cables as described in U.S. Pat. Nos. 5,183,669; 5,780,066; 5,882,694; and 5,980,226 all to Guillemette; and 5,830,516 to McAlpine et al.

Typically, in the manufacture of rubber tubing or rubber-coated wire, the molten rubber material is extruded by means of a crosshead extrusion system which receives a stream of molten rubber material and causes the molten rubber material to be distributed around the circumference of a wire or tube. In the present invention, the term molten is used to define a formable mass and is not intended to specifically suggest that the formable rubber material is in a molten or liquid state. A variety of crosshead devices have heretofore been known in the art for manufacturing hoses and for applying rubber coatings around the circumference of a wire or tubular member. Furthermore, it is known in the art to simultaneously extrude more than one layer of molten rubber to provide a multi-layer tube. Such a process is accomplished by means of multi-layer crosshead extruder devices such as that described in U.S. Pat. No. 4,798,526 to Briggs et al. Such devices typically utilize two or more crosshead extruders for co-extrusion of multiple layers.

It is also known in the art that it is extremely difficult to establish an even and balanced flow of molten material around the circumference of a wire, mandrel or tube. For example, it is known that conventional crosshead extrusion methods pose several inherent problems such as lengthy "set-up" time which is the time spent adjusting the extruder for a desired circumferential size and uniform wall gauge concentricity. After the adjustments are made and remade several times and the "set-up" is finally complete, the material being extruded from "set-up" mode to "full run" mode has, typically, become hotter on the inside, or extrude side, of the crosshead, thus causing concentricity of the tubular structure to be compromised. In addition, the overheated plastic or rubber material frequently becomes discolored and exhibits other undesirable characteristics. Furthermore, it is known that splitting and reblending of the molten material can cause the molten material to blend together unevenly forming undesirable weld or joint lines in the finished product. Accordingly, there is a need for an extrusion system which overcomes the inadequacies and undesirable characteristics of the prior art extrusion systems.

SUMMARY OF THE INVENTION

The present invention provides a new and improved crosshead extrusion system wherein the crosshead extruder housing is designed to accept a fixed center or non-adjustable die module which is capable of balancing the flow of molten material to the die and maintaining this balance from a "set-up" mode to a "full-run" mode. Die modules are known, however, such die modules are notorious for requiring continuous adjustment of the die module in the housing in order to provide hoses having acceptable cross-section size with a uniform wall gauge concentricity. It has now been found that a tubular member having a predetermined cross-section size and a uniform wall gauge concentricity can be extruded in an extrusion system, particularly, a crosshead extrusion system which employs the die module or torpedo of the present invention. The die module of the present invention has a fixed center and requires no mechanical adjustments while providing a balanced flow of molten or formable material to the die and maintains this balance from a "set-up" mode to a "full-run" mode. The tubular member formed using the extrusion system of the present invention has a predetermined cross-section size and a uniform wall gauge concentricity.

A critical feature of the new crosshead extrusion system is the construction of a fixed center die module or "torpedo" which resides inside the extruder housing. The torpedo is designed to split the molten material coming from the screw into two substantially equal parts or controlled flow, and then split each of these two parts into two more substantially equal parts, thereby providing four substantially equal parts or controlled flow, thus allowing for a balanced volume flow to the die. Another feature of the crosshead extrusion system is the outside part or the body of the crosshead extruder which is designed to accept "non adjustable" dies. Also the extruder is designed with dual controllable temperature zones in the front of the crosshead body to control the temperature of the material flowing through the body of the extruder.

DETAILED DESCRIPTION OF THE INVENTION

Figure 1:
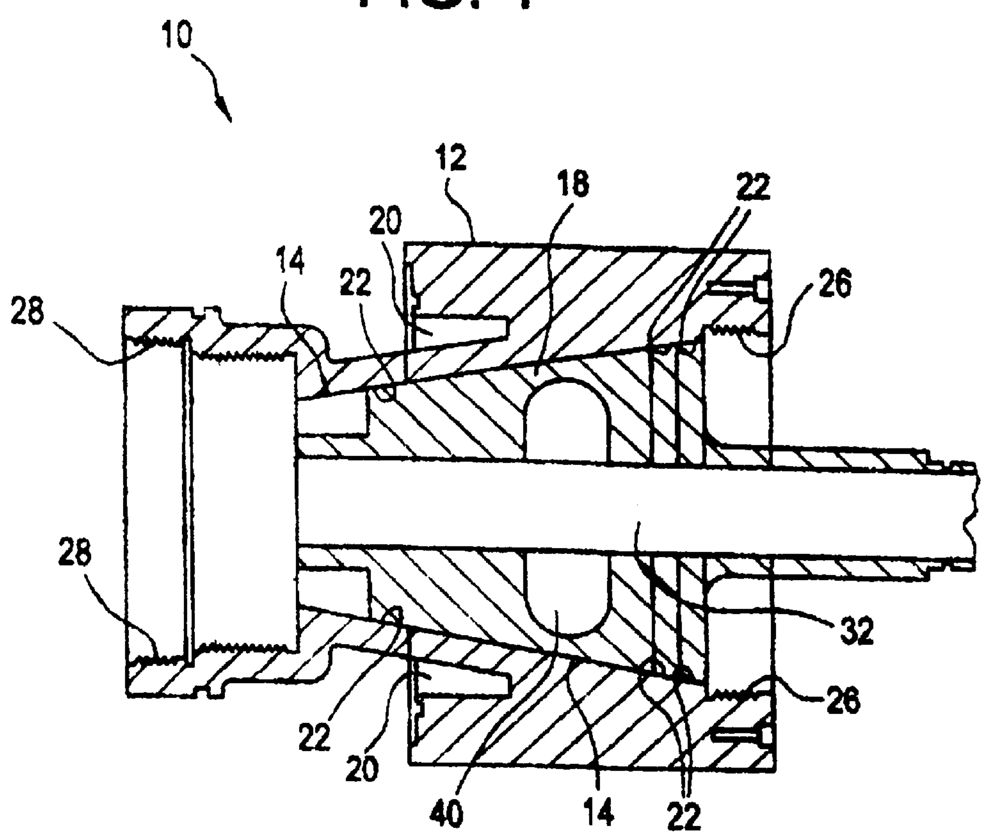
FIG. 1 is a cross-sectional view of the crosshead extrusion system of the present invention.
Figure 2:
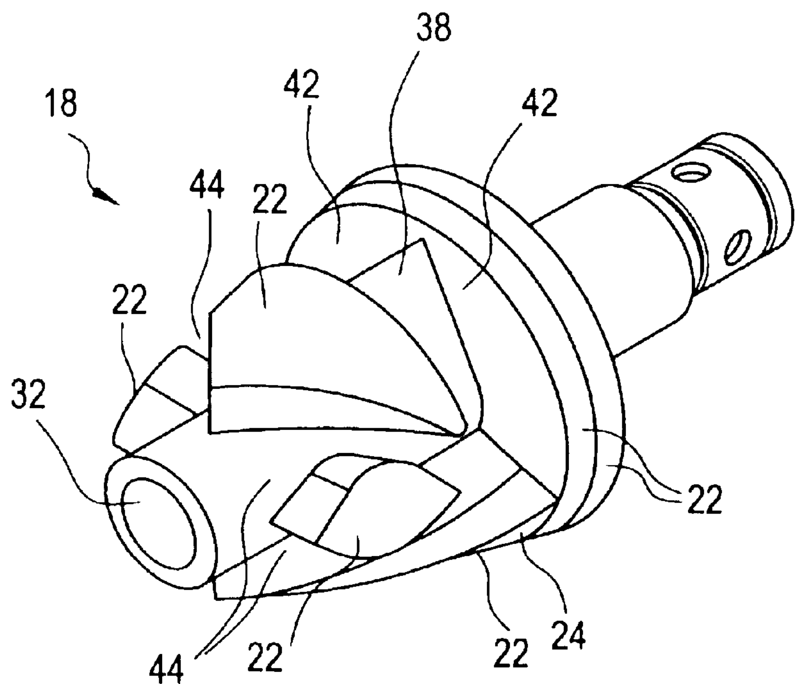
FIG. 2 is a perspective view of the fixed center die module of the present invention.
Figure 3:
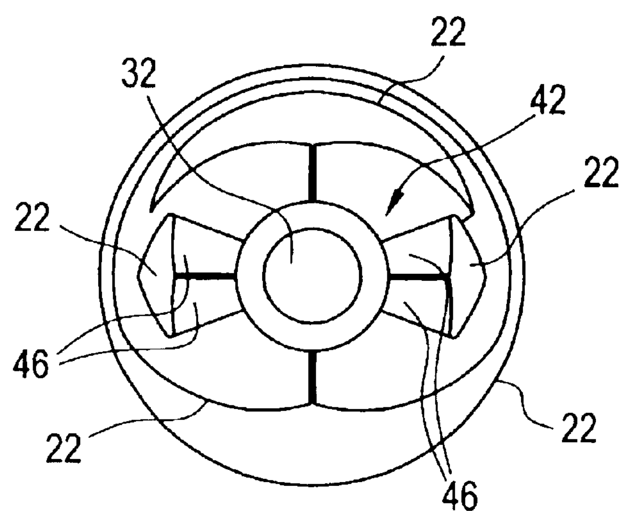
FIG. 3 is a front view of the die module of the present invention.
Figure 4:
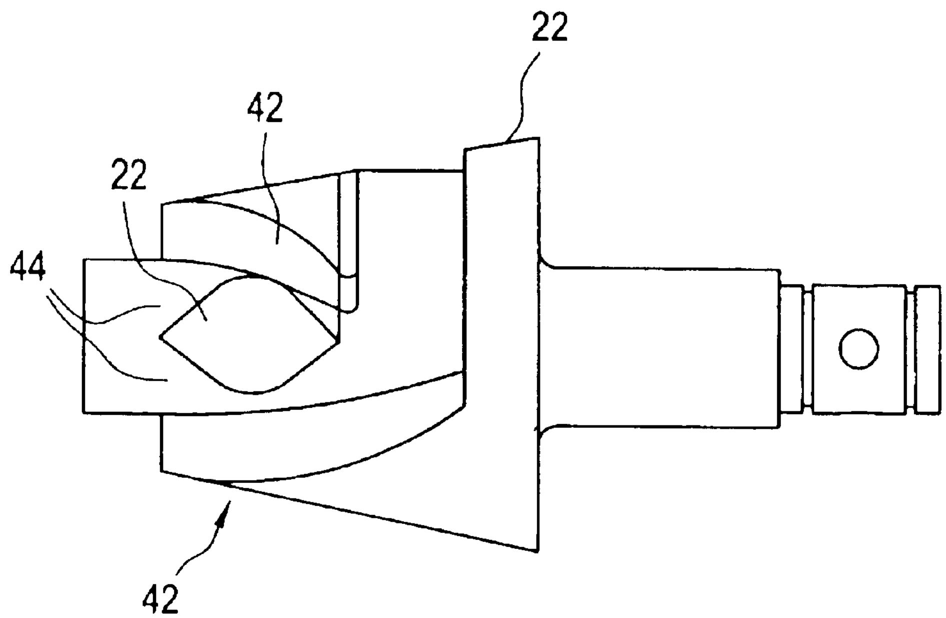
FIG. 4 is a right side view of the die module of the present invention.
Figure 5:
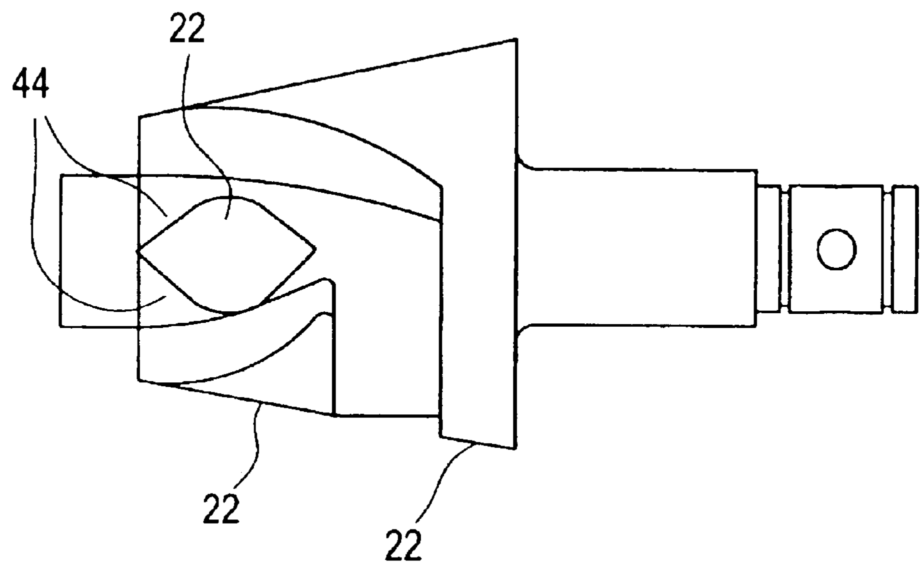
FIG. 5 is a left side view of the die module of the present invention.
Figure 6:
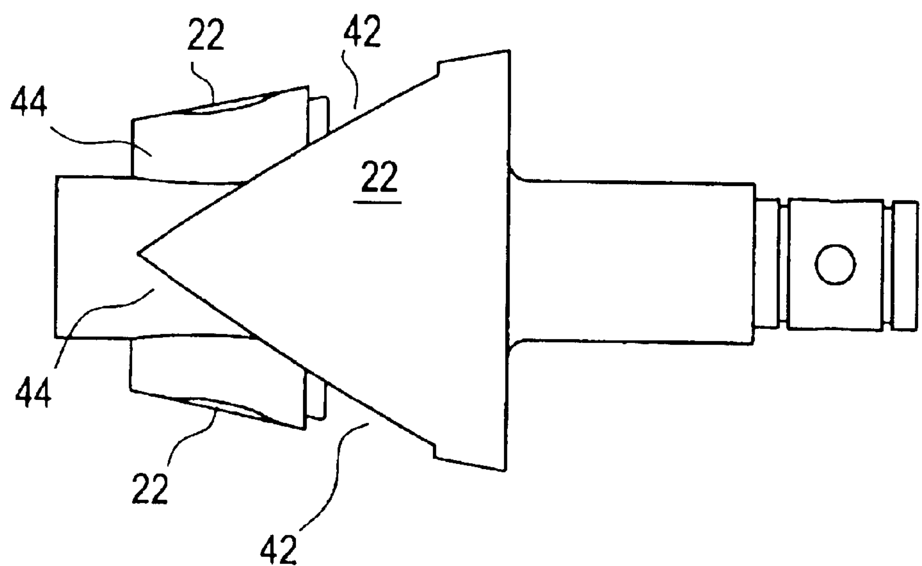
FIG. 6 is a bottom view of the die module of the present invention.
Figure 7:
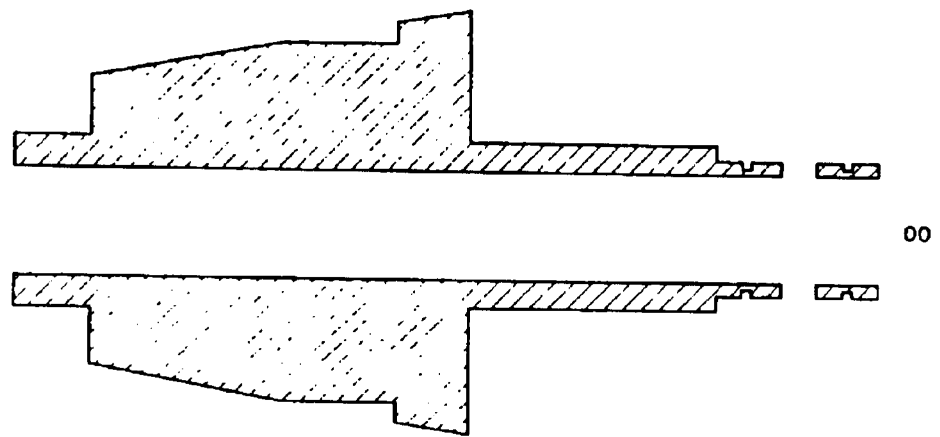
FIG. 7 is a cross-sectional view of the die module taken along line 7—7 of FIG. 6.
Figure 8:
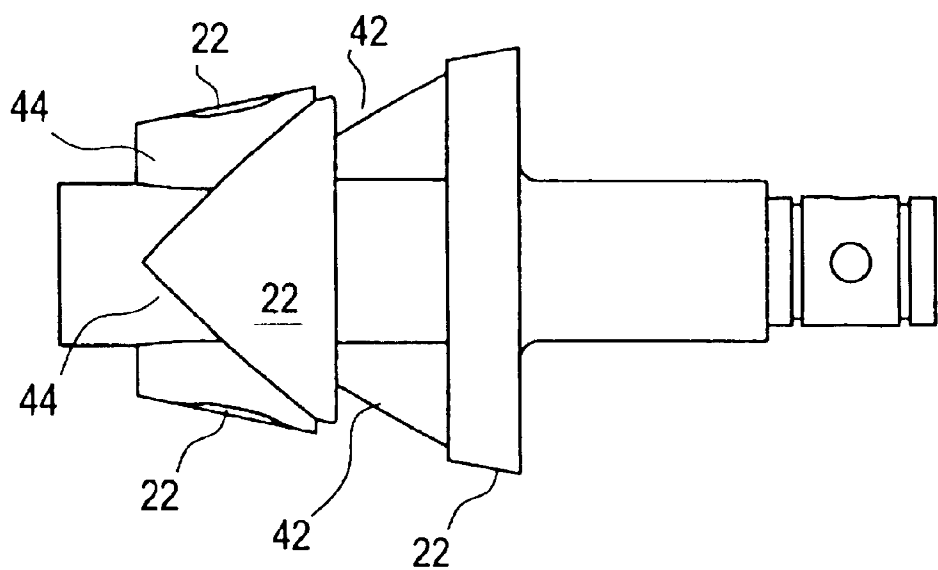
FIG. 8 is a top view of the die module of the present invention.
Figure 9:
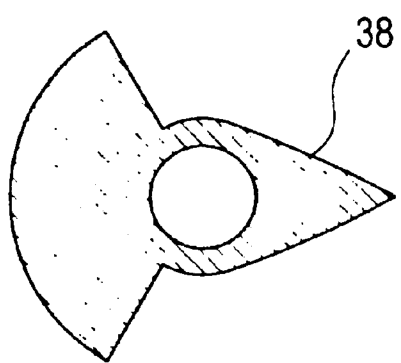
FIG. 9 is a cross-sectional view of the die module taken along line 9—9 of FIG. 8.

Turning to the drawings, FIG. 1 illustrates a cross-sectional extrusion system of the present invention. The extrusion system 10 comprises a housing 12 having a tapered interior wall surface 14, the circumference of the interior wall surface 14 being smaller in the front of the housing 12 than in the rear of the housing 12. The housing 12 is adapted with a threaded surface 28 at the front of the housing 12 to threadedly secure a die head (not shown) to the housing 12. As shown in FIG. 1, an extrusion module 18 is placed in the interior of the housing 12 such that the frusto-conical exterior surfaces 22 of the module 18 mates with the tapered interior wall surface 14 of the housing 12. The module 18 further includes wall portions 46 extending from the frusto-conical exterior surfaces 22 of the module 18 to a tubular bore 32 having uniform inner and outer circumferential surfaces. The tubular bore 32 extends axially through module 12 for transporting a wire, mandrel, or tube (not shown) in accordance with the present invention. The module 18 is secured in the housing 12 using a nut (not shown) which is threadedly locked onto the housing 12 using threaded surface 26.

Molten material such as plastic and/or vulcanized or unvulcanized rubber is delivered under high pressure and temperature to the interior of the housing 12 through conduit 40. The pressure and temperature employed are those typically used in conventional extrusion systems for similar material plastic or rubber materials. The molten material is distributed by diverter 38 in the fixed center die module through channels 42 between raised surfaces 24 to uniformly divide the molten material into two substantially equal parts or equal flow. The two separate and equal parts or flow of molten material continues to be distributed forward through the channels 44 wherein the two equal parts or flow of molten material are eventually uniformly divided into four equal parts of molten material. Finally, the four separate and equal parts of molten material are directed to tubular bore 32 where, in one aspect of the invention, the tour separate and equal parts of molten material are evenly distributed and coated onto a cylindrical body such as a hose, a wire or a mandrel, to provide a tubular structure of molten material having a predetermined cross-section and uniform wall gauge concentricity. In another aspect of the invention, the four separate and equal parts of molten material is employed to provide an unsupported hose. In a preferred aspect of the invention, one or more temperature controlling zones 20 are employed in the housing 12 to aid in controlling the wall gauge concentricity of the extruded material. Most preferably, the housing 12 is constructed with dual temperature controlling zones, and the temperature of the temperature controlling medium is monitored and controlled to assure of proper temperature.

The extrusion system of the present invention can be employed in a conventional extrusion system for the extrusion of a single or multiple layer hose using a mandrel to configure the interior circumference of the hose, or the extrusion system can be used in a cross-head extrusion system to coat wire or cable in an extrusion/coating operation. The present extrusion system also can be employed to provide an unsupported tube. The extrusion system of the present invention has been found to be particularly useful in extruding a layer of vulcanized or unvulcanized rubber material on a mandrel employing a cross-head extruder. The hose is then reinforced with a reinforcing layer such as braided fiber e.g. glass fiber, polyester fiber, polyamide fiber, partially acetyl-formed polyvinyl alcohol fiber or the like to form a high pressure hose such as that used as a power steering hose in the automotive industry.

While the extrusion system of the present invention is shown and described herein certain specific structure, it will be obvious to those skilled in the art that certain modifications may be made without departing from the spirit and scope of the invention concept as indicated by the scope of the appended claims.

What is claimed is:

1. An extrusion apparatus for continuously extruding molten material to form a tubular structure having a predetermined cross-section size and uniform wall gauge concentricity, said apparatus comprising;

an extrusion housing having a tapered interior wall surface;

an extruder die head releasably connected to said housing;

an introduction port in said housing for introducing said molten material into the interior of said housing;

a fixed center die module having a frusto-conical shape configured to slidably mate with the tapered interior wall surface of said housing wherein said fixed center die module comprises a first set of channels through which molten material, distributed into said fixed center die module, is uniformly divided into two separate and equal portions and a second set of channels through which said two separate and equal portions of molten material are subsequently uniformly divided into four separate and equal portions of molten material;

a tubular member extending longitudinally through said fixed center die module; and means for securing said fixed center die module in said housing.

2. The extrusion apparatus of claim 1, wherein said housing further comprises at least one controllable temperature zone.

3. The extrusion apparatus of claim 1, wherein said housing comprises dual controllable temperature zones in the front pad of the housing.

4. The extrusion apparatus of claim 1, wherein said tubular member has a uniform inner circumference along its longitudinal axis and a plurality of raised surfaces extending from and integral with the outer circumference of said tubular member, said plurality of raised surfaces providing said first and said second set of channels.

5. The extrusion apparatus of claim 1, wherein said apparatus is a crosshead extrusion apparatus.

6. The extrusion apparatus of claim 1, wherein the configuration of said fixed center die module precludes the need for continuous die adjustment to achieve predetermined cross-section and uniform wall gauge of said extruded tubular structure.

7. In an extrusion apparatus for continuously extruding molten plastic or rubber material to form a tubular structure comprising an extrusion housing and an extrusion die assembly, the improvement which comprises providing an extrusion housing having a tapered interior wall surface and employing in the interior of said extrusion housing, a fixed center die module comprising a tubular member having a uniform inner circumference along its longitudinal axis and a plurality of raised surfaces extending from and integral with the outer circumference of said tubular member, said plurality of raised surfaces exhibiting a frusto-conical shape configured to slidably mate with said tapered interior wall surface of said extrusion housing, said plurality of raised surfaces providing a plurality of passages between said plurality of raised surfaces such that said molten material is divided into two separate and equal parts and said two equal parts are subsequently divided into four separate and equal parts providing balanced flow of said molten material to an extrusion die head to form a tubular structure having a predetermined cross-section and uniform wall gauge concentricity, wherein the configuration of said fixed center die module precludes the need for die adjustment to achieve said predetermined cross-section size and uniform wall gauge of said extruded tubular structure.

8. The extrusion apparatus of claim 7 wherein said apparatus comprises a crosshead extruder.

* * * * *